United States Patent [19]

Lee

[11] 4,373,994

[45] Feb. 15, 1983

[54] PYROLYSIS PROCESS AND APPARATUS

[75] Inventor: Chang-Kuei Lee, Sewell, N.J.

[73] Assignee: Occidental Research Corporation, Irvine, Calif.

[21] Appl. No.: 306,551

[22] Filed: Sep. 28, 1981

[51] Int. Cl.³ .................. C10B 1/04; C10B 3/00; C10B 49/20; C10B 49/22

[52] U.S. Cl. .................................. 201/22; 34/10; 201/28; 201/31; 201/32; 201/41; 202/99; 202/108; 202/215; 208/8 R

[58] Field of Search .............. 201/22, 28, 31, 32, 201/41; 202/99, 108, 117, 121, 215; 208/8 R, 11 R; 34/10

[56] References Cited

U.S. PATENT DOCUMENTS

| | | | |
|---|---|---|---|
| 4,039,390 | 8/1977 | Logan | 201/31 |
| 4,047,883 | 9/1977 | Waters | 201/31 |
| 4,064,018 | 12/1977 | Choi | 202/99 |
| 4,071,432 | 1/1978 | Knell et al. | 208/8 R |
| 4,085,030 | 4/1978 | Green et al. | 201/22 |
| 4,101,263 | 7/1978 | Lumpkin | 201/32 |
| 4,102,773 | 7/1978 | Green et al. | 201/32 |
| 4,135,982 | 1/1979 | Green | 202/99 |
| 4,145,274 | 3/1979 | Green et al. | 202/99 |
| 4,162,943 | 7/1979 | Green | 202/99 |
| 4,163,693 | 8/1979 | Green | 201/22 |
| 4,243,489 | 1/1981 | Green | 202/99 |
| 4,324,643 | 4/1982 | Durai-Swamy | 208/8 R |
| 4,341,598 | 7/1982 | Green | 202/99 |

Primary Examiner—Bradley Garris
Attorney, Agent, or Firm—Forrest E. Logan

[57] ABSTRACT

This invention discloses a process and apparatus for pyrolyzing particulate coal by heating with a particulate solid heating media in a transport reactor. The invention tends to dampen fluctuations in the flow of heating media upstream of the pyrolysis zone, and by so doing forms a substantially continuous and substantially uniform annular column of heating media flowing downwardly along the inside diameter of the reactor. The invention is particularly useful for bituminous or agglomerative type coals.

13 Claims, 4 Drawing Figures

PYROLYSIS PROCESS AND APPARATUS

The Government has rights in or in respect of this invention pursuant to Contract No. E(49-18)-2244 awarded by the U.S. Energy Research and Development Administration.

BACKGROUND OF THE INVENTION

Fluid fossil fuels such as oil and natural gas are becoming scarce as a result of the increased world population and the increased uses for such fuels. Furthermore, since there is reason to believe that the steady importation of fluid fossil fuels into the United States could be disrupted from time to time, there is a need for a method for converting coal into liquid and gaseous fuels.

Heretofore, pyrolysis processes employing particulate solid heating media and transport reactors have had a serious problem maintaining a steady and uniform flow of particulate solid heating media into the reactor zone. Upsets and disturbances to the flow of heating media frequently occur in such systems which result in a drop in yield of pyrolysis vaporous product and, in some cases, the formation of plugs in the transport reactor or elsewhere in the system. In addition, such upsets usually result in inefficient separation of the char product from the condensable vaporous product. This in turn results in ultimate contamination of the liquid product with char product. To remove such char from the liquid product requires expensive and time-consuming separation steps which become very costly and can cause the process to be uneconomical.

The present invention reduces the tendency for such upsets and disturbances to cause non-uniform and non-constant flow of particulate solid heating media into the pyrolysis zone. The present invention, therefore, has as an objective—that of providing a substantially uniform and constant flow of particulate solid heating media into the pyrolysis zone which is particularly desirable when upstream upsets and disturbances in the flow of particulate solid heating media occur. The present invention also has as objectives improving the yield of recoverable liquid product, reducing the formation of plugs in the reactor and downstream equipment therefrom, and reducing or eliminating the need for separation of char product from liquid product.

SUMMARY OF THE INVENTION

The present invention is an improved method for controlling the flow of heated solid heating media into a pyrolysis reactor. In general, a particulate solid heating media, which has been heated to an elevated temperature, is introduced into an outer section of a fluidization zone which comprises the aforementioned outer section and an inner section. The outer section is separated from the inner section by a vertically oriented redistributor means which comprises a plurality of openings which permit communication between the outer section and the inner section. The heating media in the outer section is fluidized with a first fluidizing gas in such a manner as to cause the heating media to flow through the openings in the redistributor means and into the inner section. The inner section is formed by the redistributor means and a vertically oriented conduit reactor. The reactor has an inlet which is in such a configuration that the plane of the reactor inlet is perpendicular to the axis of the reactor. The reactor also has a plurality of secondary inlet slots which are spaced below the plane of the reactor inlet. These secondary inlet slots provide communication between the inner section and the inside of the reactor. The heating media in the inner section of fluidized with a second fluidizing gas in such a manner that a first part of the heating media is caused to flow over the reactor inlet and downwardly in column flow along the inside surface of the reactor. Simultaneously with this flow of heating media into the reactor, the fluidizing is such that a second part of the heating media is caused to flow through the secondary inlet slots into the reactor. The configuration of the secondary inlet slots and the fluidizing of the heating media in the inner section are such that the downwardly column flow of the first part of heating media along the reactor inside surface is augmented by the flow of the second part of heating media through the secondary inlet slots in such a way that a continuous and substantially circumferentially uniform downwardly flowing column of heating media is formed below the secondary inlet slots. The uniformity and continuity of the combined downwardly flowing column of heating media is an improvement to the art and permits substantially longer continuous times of pyrolysis and in general improved results.

The present invention is useful for a continuous process and apparatus for the recovery of a vaporous product and a particulate coal char from coal, and is especially effective for bituminous or agglomerative coals. In the present process, a particulate feed stream containing coal particles of a size less than about 1000 microns in diameter, and less than about 250 microns in diameter in the case of bituminous coals, is introduced downwardly, centrally and in turbulent flow into a pyrolysis zone contained in a vertically oriented conduit reactor. A transport gas for effecting turbulent flow is employed which is substantially non-deleteriously reactive with respect to the coal and the vaporous product and particulate coal char product produced from the coal. In general, the pyrolysis zone is operated at a temperature above about 700° F. In one embodiment the coal is heated to a temperature between about 700° and about 1900° F. by transfer of heat from a particulate solid heating media. In one embodiment the particulate solid heating media has a particle size less than about 2000 microns in diameter, and preferably is produced from the particulate coal char product. In general, the particulate solid heating media is introduced into the pyrolysis zone at a temperature above the pyrolysis temperature so that heat is transferred from the heating media to the particulate coal. In general, the heating media is first fluidized with a fluidizing gas in an outer fluidization section of a fluidization zone. The fluidization zone comprises an outer fluidization section and an annular inner fluidization section. The outer fluidization section is separated from the inner fluidization section by a vertically oriented annular redistributor means which has a plurality of openings communicating the outer fluidization section with the inner fluidization section. The particulate solid heating media is fluidized in the outer fluidization section with a fluidizing gas which causes the heating media to flow through the openings in the annular redistributor means and into the inner fluidization section. The inner fluidization section is formed by the annular redistributor means and a vertically oriented conduit reactor. The reactor has an inlet, an outlet, and a circular cross-section having a constant diameter over a predetermined distance from the reactor inlet. In one embodiment, the reactor is positioned concentrically to the annular redistributor means. In general, the plane of the reactor inlet is perpendicular to the axis of the reactor. The reactor has a plurality of secondary inlet slots which are located below the plane of the reactor inlet and which communicate the inner fluidization section with the inside of the reactor.

The heating media is then fluidized in the inner fluidization section with a fluidizing gas in such a manner that the heating media is caused to flow over the reactor inlet and then downwardly in annular column flow along the inside diameter of the reactor. Simultaneously to the flow of heating media over the top of the reactor, the fluidizing causes the heating media to flow through the secondary inlet slots into the reactor, thereby augmenting the annular column flow of the heating media along the reactor inside diameter in such a way that a continuous and substantially circumferentially uniform annular downwardly flowing column of heating media is formed below the secondary inlet slots.

Simultaneously there is formed a turbulent stream of particulate coal and a transport gas. The turbulent stream is introduced into the reactor downwardly and along the reactor axis at a point below the plane of the reactor inlet and near the upper part of the substantially circumferentially uniform annular downwardly flowing column of heating media. The coal is pyrolyzed in a pyrolysis zone within the reactor and within the predetermined distance from the reactor inlet by transferring heat from the heating media to the coal and producing from the coal a vaporous product and a coal char product. A stream comprising the vaporous and char products, the fluidizing gases, and the transport gas is removed from the pyrolysis zone and from the reactor through the reactor outlet. When the coal is an agglomerative type coal or a bituminous coal, it is preferred to use an annular heat shield around that part of the coal feed conduit which extends into the fluidization chamber. An annular space is formed by the annular heat shield and the first feed conduit through which a gas is made to flow. The gas cools the coal feed conduit and prevents the coal from reaching its agglomeration temperature within the first feed conduit.

It will be understood, that the turbulent stream of particulate coal and transport gas which is introduced downwardly and centrally into the reactor along its axis is under flow conditions sufficient to cause the coal and the heating media to be thoroughly mixed. Heat is rapidly transferred from the heating media to the coal, thereby causing the coal to be pyrolyzed, thereby producing the vaporous and particulate coal char products.

In general, the fluidizing gases, which in combination cause the particulate solid heating media to flow into the conduit reactor, and the heat shield gas if such is used, are substantially non-deleteriously reactive with respect to the coal, the vaporous product and the particulate coal char product.

In one embodiment of the present invention, the particulate solid heating media has a temperature between about 800° and about 2000° F., and the ratio of the heating media to the coal introduced into the pyrolysis zone is between about 2 parts by weight heating media per part by weight coal to about 20 parts by weight heating media per part coal, i.e. about 2/1 to about 20/1.

In another embodiment of this invention, the coal is bituminous coal. In a still further embodiment, the bituminous coal is heated to a temperature between about 1000° and about 1500° F. in the pyrolysis zone.

In a further embodiment, the stream removed through the reactor outlet is separated into a substantially gaseous stream which comprises the fluidizing and transport gases, and a substantially solid stream which comprises the char product and the heating media. The separated solid stream is heated by partial combustion with oxygen, thereby forming a heated solid stream. The heated solid stream is then recycled to the outer fluidization section as the particulate solid heating media.

The process of this present invention can be carried out in the particular design of the pyrolysis reactor of the present invention. The present invention, therefore, includes an apparatus which is operative for pyrolyzing coals. The apparatus of the present invention comprises a conduit reactor having an inlet, an outlet and a circular cross-section of constant inside diameter over a predetermined distance from the inlet. The axis of the reactor is vertically oriented and the plane of the inlet is perpendicular to the axis.

A first feed conduit is provided which is operative for conveying a mixture comprising a transport gas and particulate coal in turbulent flow. The conduit reactor has an inlet and an outlet, and has a circular cross-section and an axis which coincides with the reactor axis. The plane of the first feed conduit outlet is perpendicular to the axis and in communication with the reactor inlet in such a way that the plane of the first feed conduit outlet is below the plane of the reactor inlet. In general, the reactor inside diameter, which is constant over the predetermined length, is at least about 3 times the largest outside diameter of that part of the first feed conduit which is below the plane of the reactor inlet. In an embodiment which is particularly useful for pyrolyzing agglomerative type coals or bituminous coals, first feed conduit also comprises a heat shield which prevents the coal from being heated over its agglomeration temperature in the first feed conduit. In this embodiment, the reactor inside diameter, which is constant over the predetermined length, is at least about 3 times the largest outside diameter of that part of the heat shield which surrounds the first feed conduit which is below the plane of the reactor inlet.

A fluidization chamber is provided which is operative for fluidizing therein a mixture of particulate solid heating media with a fluidizing gas. The chamber is in communication with the reactor inlet, and comprises a cylindrical outer shell having an inside diameter which is at least about 2 times the outside diameter of the reactor. In one embodiment of this invention the axis of the cylindrical outer shell coincides with the reactor axis. However, it is not necessary that the outer shell of the fluidization chamber be concentric with the reactor axis in all embodiments as will be further explained below. A top cover is provided which is above the plane of the reactor inlet, and which is fastened to the upper part of the shell. The first feed conduit, and heat shield if such is used, passes through, and is fastened to, the top cover. A bottom cover is provided which is below the plane of the reactor inlet, and which is fastened to the lower part of the shell. The reactor passes through, and is fastened to, the bottom cover. The chamber also comprises a first fluidization means which is spaced above the bottom cover but below the plane of the reactor inlet. The first fluidization means is operative for introducing a fluidizing gas into the chamber to fluidize particulate solid heating media therein in a substantially uniform manner.

The chamber further comprises a second feed conduit having an outlet which is below the plane of the reactor inlet and preferably above the first fluidization means. The second feed conduit is radially displaced from the reactor and is operative for introducing a stream of particulate solid heating media into the chamber.

An annular redistributor means is provided in the chamber which has an inside and an outside diameter, and in one embodiment an axis which coincides with the reactor axis. The redistributor means has a large number of openings which extend radially through the redistributor means. The redistributor means is located radially outwardly of the reactor outside diameter, but radially inwardly, with respect to the reactor axis, of the second feed conduit. The redistributor means extends upwardly to about the plane of the reactor inlet and in one embodiment downwardly to the bottom cover of the fluidization chamber. The plane of the upper edge of the redistributor means is perpendicular to its axis and is at least as high, or in one embodiment, somewhat higher than the plane of the reactor inlet. The redistributor means forms in the chamber an outer fluidization section between the shell and the redistributor means, and an inner fluidization section between the reactor outside diameter and the redistributor means.

The conduit reactor contains a plurality of secondary inlet slots in the upper part thereof which extend radially through the reactor. The slots have slot height, a slot width, and a downward slope with respect to the reactor axis. The slots are below the plane of the reactor inlet, and about the same height as the plane of the first feed conduit outlet. The slots are operative, when the apparatus is in use, to permit particulate solid heating media to flow from the inner fluidization section through the slots into the reactor.

In one embodiment, the reactor inside diameter, which is constant over a predetermined length, is from about 3 to about 30 times larger than the largest outside diameter of that part of the first feed conduit, including the heat shield if such is used, which is below the plane of the reactor inlet. In one embodiment of this invention, the redistributor means inside diameter is at least about 1.25 times the reactor outside diameter. In one embodiment, the upper extremity of the slots in the reactor is at least about 1 inch below the plane of the plane of the reactor inlet, the slot height is at least about ⅛ of an inch, the slot width is at least about 1 inch, and the slots are separated circumferentially by an arc length of at least about 0.5 inch. In one embodiment of this invention, the redistributor means inside diameter is from about 1.25 to about 2 times the reactor outside diameter. In one embodiment, the upper extremity of the slots in the reactor is about 1 to about 12 inches below the plane of the reactor inlet, the slot height is from about ⅛ to about 1 inch, the slot width is from about 1 to about 6 inches, and the slots are separated circumferentially by an arc length of from about 0.5 to about 2 inches. Dimensions which fall outside of these ranges can be used, however. In particular, the upper limit of the various slot dimensions depend on the diameter of the reactor and the location of the first feed conduit outlet. Slot dimensions also depend on the feed rates of particulate solid heating media and coal.

In one embodiment of the present invention, the process of the present invention is conducted in the apparatus of the present invention. However, it is to be understood that it is not necessary that the process of the present invention be conducted in the apparatus of the present invention.

In the present process, a stream comprising the vaporous product, the particulate coal char product, the particulate solid heating media, the fluidizing gases, and the transport gas, is removed from the pyrolysis zone through the conduit reactor outlet. This mixture is then passed to a first separation zone, such as one or more cyclone separators, to separate at least the bulk of the solids from the gases and vapors contained in the stream discharged from the conduit reactor outlet.

DETAILED DESCRIPTION

Figure 1:
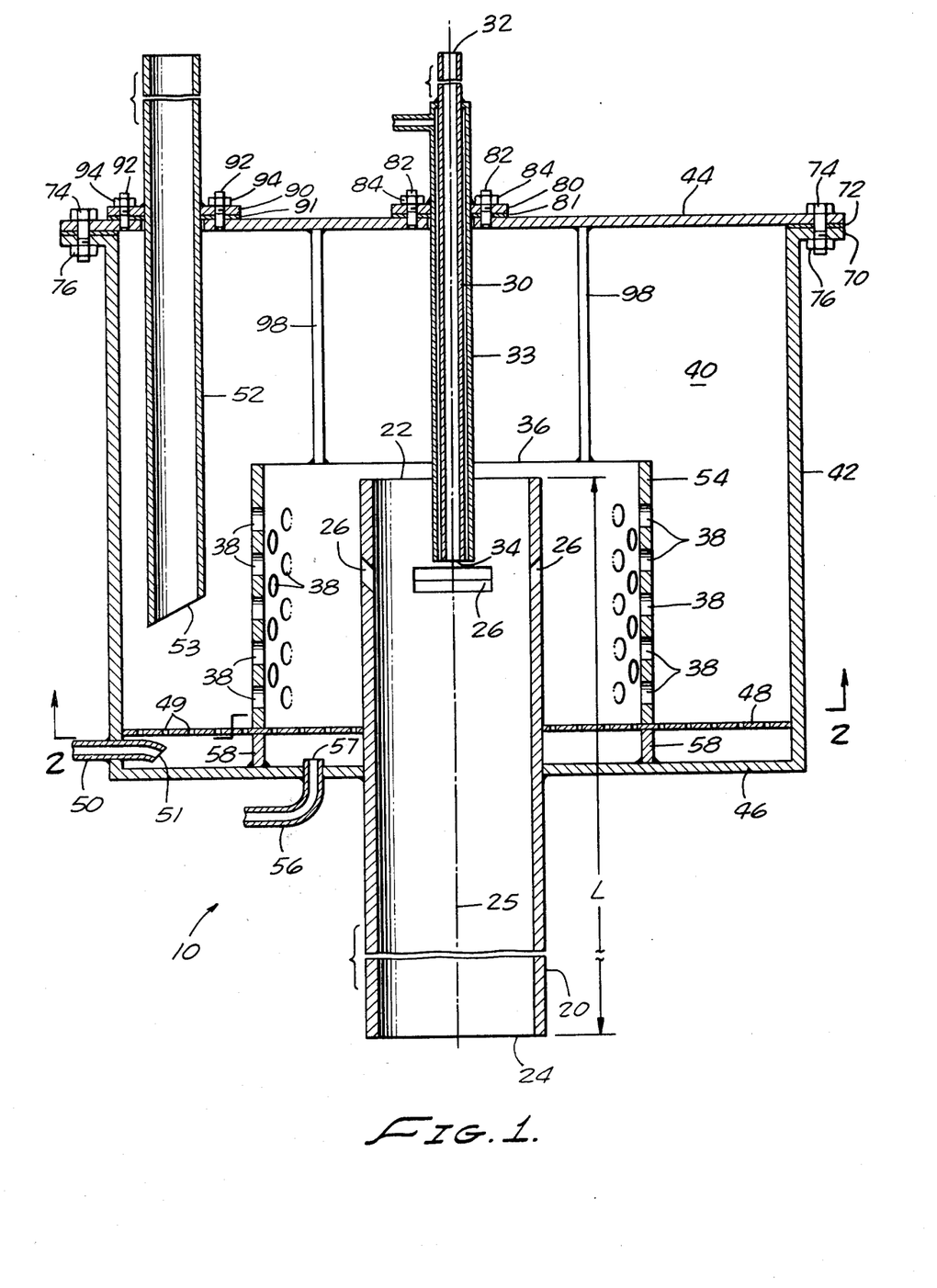
FIG. 1 is a drawing of one embodiment of a pyrolysis reactor.

With reference to FIG. 1, according to the present invention there is provided a pyrolysis reactor 10 which is operative for pyrolyzing coals. The pyrolysis reactor comprises conduit reactor 20 having an inlet 22 and outlet 24. Conduit reactor 20 has a circular cross-section of constant inside diameter over predetermined length L. Axis 25 of reactor 20 is vertically oriented, and the plane of inlet 22 is perpendicular to axis 25. First feed conduit 30, which is operative for conveying a mixture of a transport gas and particulate coal in turbulent flow, has inlet 32 and outlet 34, and has a circular cross-section and an axis which coincides with reactor axis 25. The plane of first feed conduit outlet 34 is perpendicular to axis 25 and is in communication with reactor inlet 22 in such a way that the plane of first feed conduit outlet 34 is below the plane of reactor inlet 22. Reactor 20 is provided in the upper part thereof, with a plurality of secondary inlet slots 26 through which additional solid heating media can flow into the reactor. As shown in the particular embodiment of FIG. 1, the plane of outlet 34 is below the plane of inlet 22 and extends into reactor 20 to an elevation about equal to the elevation of the slots. The inside diameter of reactor 20 is at least about 3 times the largest outside diameter of that part of the first feed conduit 30 which is below the plane of the reactor inlet, thereby providing an opening which is at least about 90 percent of the cross-sectional area conduit 20 based on its inside diameter. In the preferred embodiment shown in FIG. 1, first feed conduit 30 also comprises an annular heat shield 33 which is concentric to first feed conduit 30 and extends from first feed conduit outlet 34 upward through the top cover of fluidization chamber. In this embodiment wherein the first feed conduit 30 also comprises annular heat shield 33, the inside diameter of reactor 20 is, in general, at least about 3 times the outside diameter of annular heat shield 33.

Fluidization chamber 40, which is operative for fluidizing a mixture of particulate solid feeding media, comprises cylindrical outer shell 42, top cover 44, bottom cover 46, aeration partition means 48, first aeration means 50, second aeration means 56, second feed conduit 52, and annular redistributor means 54. Cylindrical outer shell 42 has an inside diameter which is at least 2 times the outside diameter of reactor 20, and the axis of cylindrical outer shell 42 and the axis of redistributor means 54 coincide with the reactor axis thereby providing an operative bed configuration to effect uniform fluidization. Top cover 44 is spaced above the plane of reactor inlet 22 and is fastened to cylindrical outer shell 42. First feed conduit 30, which comprise annular heat shield 33, passes through and is fastened to top cover 44. Bottom cover 46 is located below the plane of reactor inlet 22 and is fastened to the lower part of cylindrical outer shell 42. Reactor 20 passes through and is fastened to bottom cover 46. Aeration partition means 48 is spaced above bottom cover 46, but below the plane of reactor inlet 22. First and second aeration means 50 and 56 have outlets 51 and 57 which are located below aeration partition means 48. Second feed conduit 52 has an outlet 53 which is spaced below the plane of reactor inlet 22, but above aeration partition means 48. Aeration partition means 48 contains a plurality of holes 49 for the passage of fluidizing gases into the outer and inner section of the fluidization chamber. Alternative to aeration partition means 48 and first aeration means 50, as well as aeration partition means 48 and second aeration means 56, any fluidization means operative for fluidizing the solid particulate heating media in the outer and inner fluidization sections can be used. Second feed conduit outlet 53 is located in the outer section of the fluidization chamber. Preferably, all of conduit 52 is radially displaced from reactor 20.

As can be seen in FIG. 1, annular redistributor means 54 is concentric to conduit 30 and reactor 20, and has a diameter which is larger than the outside diameter of reactor 20 but smaller than the inside diameter of shell 42. In general it is not necessary in all embodiments of this invention that annular redistributor means 54 be concentric to conduit 30 and reactor 20 as will be explained below. The plane of upper extremity 36 of redistributor means 54 is perpendicular to its axis. In general, the elevation of the plane of upper extremity 36 is at least as high as the plane of reactor inlet 22. In the embodiment shown in FIG. 1, upper extremity 36 of redistributor means 54 is somewhat higher than reactor inlet 22. Redistributor means 54 extends from the plane of reactor inlet 22 to aeration partition means 48. Redistributor means 54 contains a plurality of openings 38 which extend radially through the redistributor means and provide communication between the outer fluidization section and the inner fluidization section.

As can be seen in FIG. 1, conduit reactor 20, first feed conduit 30, and fluidization chamber 40 which comprises cylindrical outer shell 42 and annular redistributor means 54, all have a common axis, i.e. axis 25. It is not a requirement of this invention that in all embodiments that cylindrical outer shell 42 of fluidization chamber 40 and annular redistributor means 54 have a common axis with conduit reactor 20 and feed conduit 30.

As shown in FIG. 1, the elements of pyrolysis reactor 10 are fastened together by means of nuts and bolts or welds. For example, top cover 44 is fastened to cylindrical outer shell 42 by the conventional means of a flange 70, gasket 72, bolt 74, and nut 76. First feed conduit 30, which comprises annular heat shield 33, is similarly fastened to top cover 44 by means of flange 80 which is welded to annular heat shield 33 and studs 82 which are welded to top cover 44 and nuts 84 and gasket 81. Similarly, second feed conduit 52 is fastened to top cover 44 by means of flange 90 which is welded to conduit 52, gasket 91, studs 92 which are welded to top cover 44, and nuts 94. Although the various elements of pyrolysis reactor 10 have been shown to be fastened together in FIG. 1 by conventional means such as flanges, gaskets, nuts and bolts and welds, any suitable means of fastening may be employed. The particular arrangement of joining the various elements together shown in FIG. 1 is an embodiment of this invention which is particularly useful since it facilitates disassembly and inspection of the pyrolysis reactor from time to time. Other arrangements of arranging the various elements together can be devised by those skilled in the art. For example, bottom cover 46 and cylindrical outer shell 42 can be fastened together in a manner similar to top cover 44 and shell 42, and reactor 20 can be fastened to bottom cover 46 in the same manner that conduit 30 is fastened to top cover 44. Redistributor means 54 is secured in its proper position by means of several struts 98 which are welded to top cover 44 and redistributor means 54. Other means of support for redistributor means 54 can be provided, such as supporting by means of struts attached to cylindrical outer shell 42 or struts attached to conduit reactor 20.

Aeration partition means 48 is supported by annular divider means 58 which also acts to separate fluidization gases 93 and 95 as they are distributed under aeration partition means 48. In this manner, that is, by using two separate sources of fluidization gas, inner fluidization zone 107 can be independently controlled, if desired, from outer fluidization zone 105 as shown in FIG. 3.

As shown in FIG. 1, reactor inlet 22 actually consists of an annular opening formed by the outside diameter of annular heat shield 33 and the inside diameter of conduit reactor 20 in such a manner that about 90 percent or more of the inlet area of reactor 20 is open.

Figure 2:
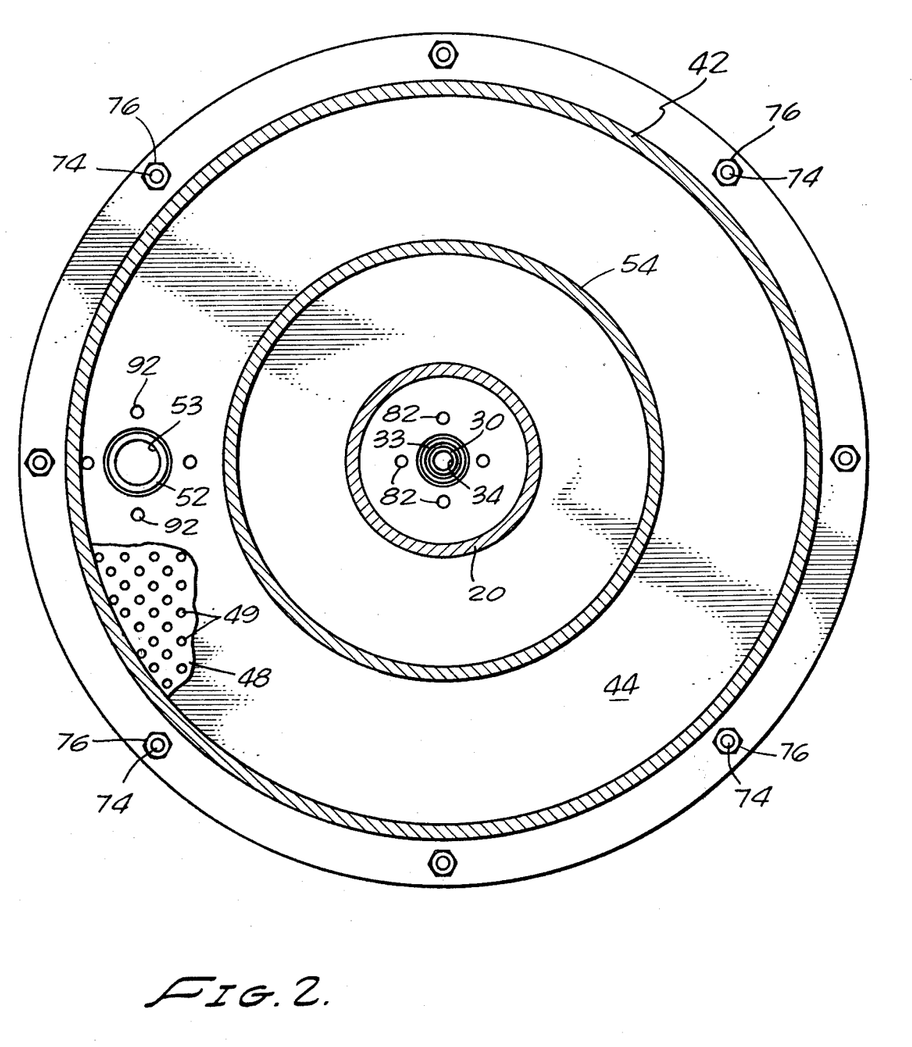
FIG. 2 is a view through FIG. 1 taken along line 2 of FIG. 1.

FIG. 2 is a view of FIG. 1 taken along the line 2—2 of FIG. 1. In this particular embodiment of the present invention, aeration partition means 48 is a perforated plate having a plurality of openings 49 through which a fluidizing gas flows. Aeration partition means can be a screen or another design suitable for effecting fluidization. For example, aeration partition means 48 and first aeration means 50, as well as aeration partition means 48 and second aeration means 56, can be replaced with any fluidization means operative for fluidizing the solid particulate heating media in the outer and inner fluidization sections.

Figure 3:
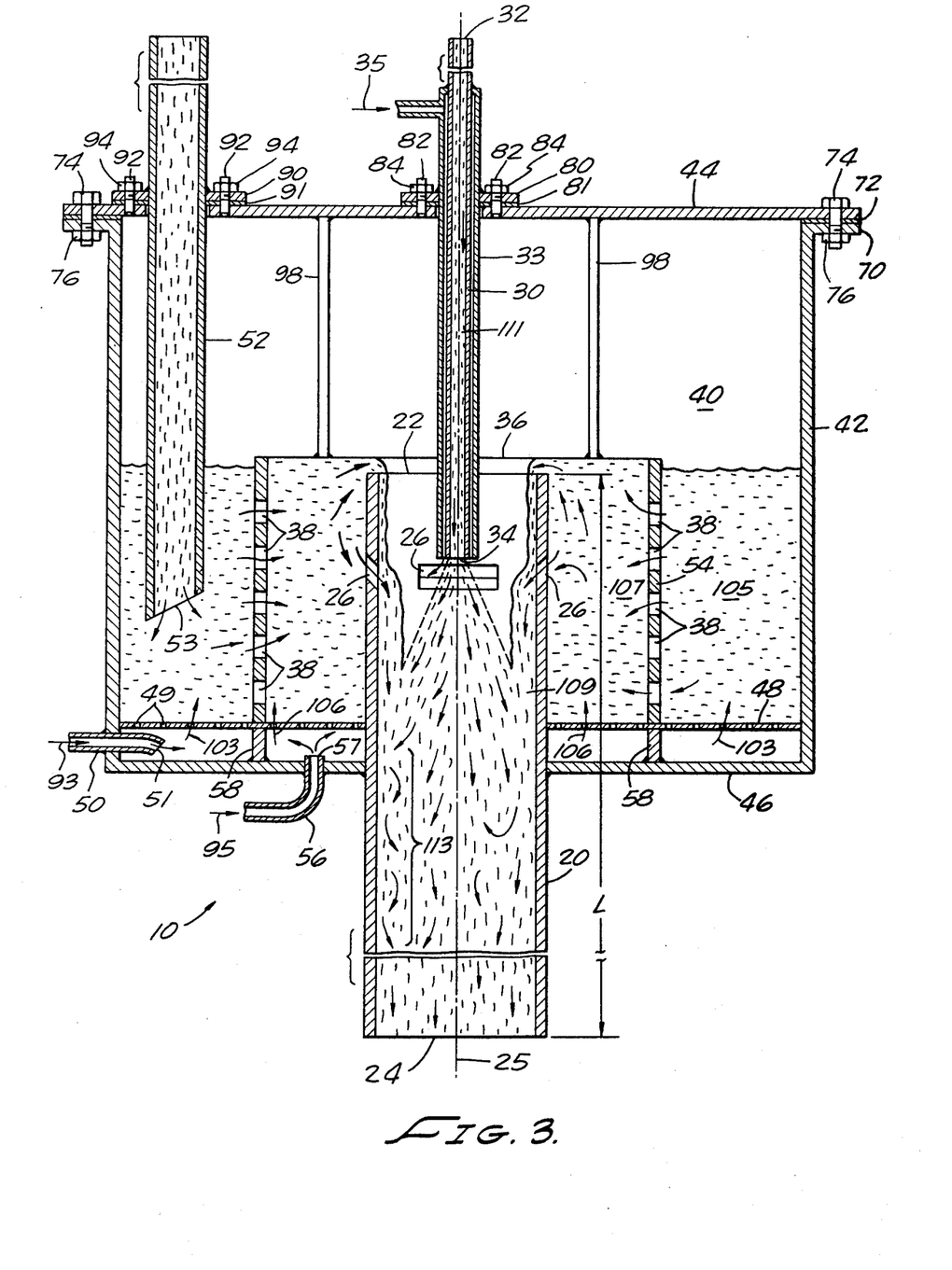
FIG. 3 is a drawing showing the pyrolysis reactor of FIG. 1, when in use, showing flow of solid materials.

FIG. 3 depicts pyrolysis reactor 10 when it is employed for pyrolyzing coal by the present invention. In the present invention particulate solid heating media, such as heated particulate coal char, is introduced through conduit 52 into fluidization chamber 40, together with fluidization gas 93 introduced through first aeration means 50. The fluidizing gas flows upwardly through opening 49 in aeration partition means 48, as shown by arrows 103, in such a way that the particulate solid heating media is maintained in a fluidized state as shown by the fluidized bed in outer fluidization section 105. The heating media, which has been fluidized in outer fluidization section 105, flows through openings 38 in redistributor means 54 into inner fluidization section 107. Fluidizing gas 95 introduced through aeration means 56 exits through outlet 57 and is distributed around the outside of reactor 20 and flows through aeration partition means 48 as shown by arrows 106. The flow of aeration gas 95 into fluidized bed 107 is adjusted so that the particulate solid heating media flows upwardly and spills over reactor inlet 22 in an annular column flow along the inside diameter of the reactor, while simultaneously causing the heating media to flow through slots 26 into the reactor, thereby augmenting the annular column flow of heating media along the reactor inside diameter in such a way that a continuous and substantially circumferentially uniform annular downwardly flowing column of heating media is formed below the slots, as shown by column 109 in FIG. 3.

A turbulent mixture 111 of particulate coal and a transport gas is conveyed in conduit 30 and introduced downwardly and centrally into reactor 20 along the axis 25. In order to prevent the coal in conduit 30 from being heated an undesirable amount prior to its discharge into the pyrolysis zone, a small amount of gas is fed through the annular space between the heat shield 33 and conduit 30. This heat shield gas is also introduced downwardly into the reactor. The heat shield gas should also be substantially non-deleteriously reactive with respect to the coal, the vaporous product, and the particular coal char product. The coal and heating media are rapidly mixed in pyrolysis zone 113 which is contained in reactor 20. The coal is pyrolyzed in pyrolysis zone 113 by the rapid transfer of heat from the heating media to the coal and a vaporous product and a particulate coal char product is produced directly from the coal. The temperature to which the coal is heated is controlled by adjusting the relative amounts of the heating media entering through conduit 52 and the amount of coal entering through conduit 30, as well as by adjusting the temperature of the heating media before it is introduced into fluidized bed 105. A stream from the pyrolysis zone which comprises the vaporous product, the particulate coal char product, the heating media, and the fluidizing gases, the transport gas, and heat shield gas if employed, is removed from the pyrolysis zone through reactor outlet 24.

The process and apparatus of the present invention are particularly useful for bituminous or agglomerative coals because downwardly flowing annular column 109 of heating media forms a shield along the inside surface of reactor 20 which prevents the coal when it is in its tacky state from adhering to the inside surface of reactor 20 which, if it were to so adhere, would eventually plug reactor 20. The heat shield and the heat shield gas are particularly useful when pyrolyzing bituminous or agglomerative type coals since its prevents premature agglomeration of the coal in conduit 30 by preventing the coal from reaching agglomerative temperature in conduit 30. However, for non-agglomerative coals such as subbituminous coals, heat shield 33 and a heat shield gas are not required.

Figure 4:
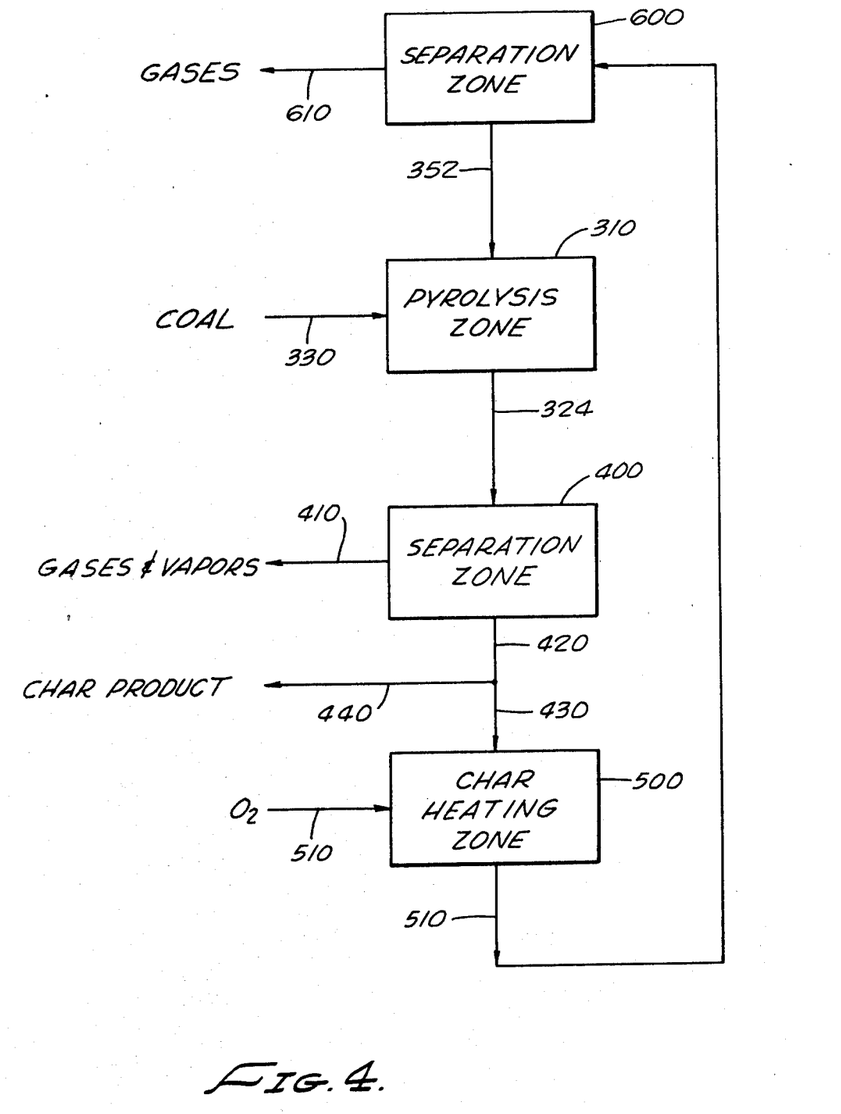
FIG. 4 is a schematic diagram of a pyrolysis process suitable for use with the apparatus or process of the present invention.

With reference to FIG. 4, particulate coal in stream 330 is introduced into pyrolysis zone 310, together with heated particulate coal char in stream 352. About 2 parts by weight of heated coal char per part by weight of coal, to about 20 parts by weight of heated coal char per part by weight of coal are introduced into pyrolysis zone 310. The temperature of heated coal char stream 352 is from about 800° to about 2000° F. Pyrolysis zone 310 is maintained at a temperature between about 700° and about 1900° F. by adjusting the temperature of the heated coal char in stream 352 and the ratio of heated coal char to coal fed to pyrolysis zone 310. In general pyrolysis zone 310 is maintained under the conditions described above. In one embodiment of the process, pyrolysis is conducted in the pyrolysis reactor of FIG. 1.

In another embodiment of this invention, fluidization chamber 40 can be made to accommodate a plurality of reactors similar to reactor 20. Each reactor comprises its own annular baffle means and feed conduit. In such a system, a plurality of char feed conduits, similar to conduit 52, can also be provided. In this manner a single fluidization chamber can serve a plurality of coal pyrolysis reactors, thereby facilitating scale-up to larger pyrolysis systems. In such configurations the fluidization chamber and annular redistributor means cannot be made concentric to all conduit reactors. If desired each conduit reactor could be provided with its own annular redistributor means while all are served by a single fluidization chamber.

The products of pyrolysis which comprise gases and vapors, as well as a newly formed coal char product, are removed from pyrolysis zone 310 by means of stream 324 which is then introduced into separation zone 400 wherein gases and vapors which comprise vapors produced directly from the coal are removed in stream 410. Separated solids, which comprise the spent heated char and the newly formed char product, are removed in stream 420 from separation zone 400. Separation zone 440 may be a series of cyclone separators or the like. An amount of these solids which are necessary for recycle to the pyrolysis zone is divided from stream 420 into stream 430, and the remainder is removed as char product in stream 440. Stream 430 of char solids is introduced into char heating zone 500 where it is partially combusted and heated with a gas comprising oxygen, such as air, or oxygen-enriched air, or a commercial grade gaseous oxygen, introduced through stream 510. The amount of oxygen in the oxygen-containing gas of stream 510 is between about 0.01 parts by weight per part by weight coal char and about 0.10 parts by weight per part by weight coal char. The char solids are heated in char heating zone 500, which preferably is a transfer line combustor, fluidized bed combustor or the like, to a predetermined temperature operable for recycle to and use in pyrolysis zone 310 as the heat supplying heated char. Heated char is removed from char heating zone 500 in stream 510 and introduced into separation zone 600, which may be a series of cyclone separators or the like, wherein the combustion gases are separated and removed in stream 610 and the heated char is removed and recycled to pyrolysis zone 310 in stream 352.

Stream 352 is the feed stream introduced into the inlet of second feed conduit 52 of FIG. 1. Similarly, coal stream 330 is the feed stream introduced into inlet 32 of first feed conduit 30 of FIG. 1. Product removal stream 324 corresponds to the discharge stream from outlet 24 of conduit reactor 20 of FIG. 2.

EXAMPLE

A pyrolysis reactor of the general configuration depicted in FIG. 1 is used for the pyrolysis of coal wherein conduit reactor 20 has an inside diameter of about 10 inches, outer cylindrical shell 42 has an inside diameter of about 20 inches, first feed conduit 30 has an outside diameter of about 1.1 inches at outlet 34, second feed conduit 52 has an outside diameter of about 2 inches, aeration partition means 48 is spaced about 1 inch above bottom cover 46, annular redistributor means 54 having an inside diameter of about 14 inches, and a wall thickness of about 0.25 inches, is spaced about 1 inch above the plane of reactor inlet 22, the plane of outlet 34 is spaced about 2 inches below the plane of reactor inlet 22, redistributor means has 1 inch diameter holes, and outlet 53 is spaced about 10 inches below the plane of reactor inlet 22. The length of reactor 20, over which reactor 20 has a constant diameter, and in which the pyrolysis zone is contained, is about 36 inches to about 60 inches. The dimensions of secondary inlet slots 26 are a slot height of about ⅛ inch, a slot width of about 2 inches, and the slots are separated by an arc length of about 1 inch. The upper part of the slot is about 2 inches below reactor inlet 22.

About 1500 pounds per hour of heated particulate coal char is introduced into fluidization zone 40 through second feed conduit 52 wherein it is fluidized with a fluidized gas which consists of a mixture of steam, carbon dioxide, or mixtures thereof and which is introduced at a rate of about 40 pounds per hour through first aeration means 50. A second fluidizing gas consisting of steam, carbon dioxide, or mixtures thereof is introduced through second aeration means 56 at a rate of from about 2 to about 20 pounds per hour to lift the heated char upwardly in inner fluidization section 107 and thence to discharge the heated char downwardly in annular column flow along the inside diameter of conduit reactor 20. Simultaneously the second fluidizing gas, 95 in FIG. 3, causes the heating media also to flow through slots 26 into the reactor thereby augmenting the annular column flow of the heating media along the reactor inside diameter in such a way that a continuous and substantially circumferentially uniform annular downwardly flowing column of heating material is formed below the slots. A turbulent stream of particulate coal and a transport gas are conveyed through first feed conduit 30 and discharged downwardly and centrally into conduit reactor 20 at a rate of about 300 pounds of coal per hour and about 50 pounds of transport gas per hour. The transport gas is a recycled pyrolysis gas which comprises hydrogen, carbon dioxide, carbon monoxide, steam, methane, and other light hydrocarbon gases.

The heated coal char, conveyed in second feed conduit 52 at a temperature of about 1300° F., is introduced into fluidization chamber 40. Heat is transferred from the downwardly flowing annular column of heated particulate char in conduit reactor 20 to the particulate coal. A stream comprising gaseous and vaporous products and newly-formed coal char product, as well as the spent heated char, the fluidizing, lift and transport gases, is removed through outlet 24 of conduit reactor 20. About 0.5 pounds of gaseous and vaporous product, and about 0.5 pounds of newly-formed coal char product are produced per pound of particulate coal directly from the coal.

After separation, the gases and vapors in stream 410 are sent to a product recovery section, not shown in the figures, wherein gases such as methane, carbon monoxide, carbon dioxide, and coal liquids are separated and recovered.

What is claimed is:

1. A method for controlling the flow of solid heating media into a pyrolysis reactor comprising:
   a. introducing a heated particulate solid heating media into an outer section of a fluidization zone which comprises said outer section and an inner section, said outer section being separated from said inner section by a vertically oriented redistributor means having a plurality of openings communicating said outer section with said inner section;
   b. fluidizing said heating media in said outer section with a fluidizing gas and causing said heating media to flow through said openings into said inner section, said inner section being formed by said redistributor means and a vertically oriented conduit reactor, said reactor having an inlet, the plane of said reactor inlet being perpendicular to the axis of said reactor, said reactor having a plurality of secondary inlet slots below the plane of said reactor inlet communicating said inner section with the inside of said reactor; and
   c. fluidizing said heating media in said inner section with a fluidizing gas and causing a first part of said heating media to flow over said reactor inlet and then downwardly in column flow along the inside surface of said reactor, and simultaneously causing a second part of said heating media to flow through said secondary inlet slots into said reactor thereby augmenting the downwardly column flow of said first part of said heating media along said reactor inside surface in such a way that a continuous and substantially circumferentially uniform downwardly flowing column of said heating media is formed below said secondary inlet slots.

2. A process for pyrolyzing coal comprising:
   a. introducing a heated particulate solid heating media into an outer section of a fluidization zone which comprises said outer section and an annular inner section, said outer section being separated from said inner section by a vertically oriented annular redistributor means having a plurality of openings communicating said outer section with said inner section;
   b. fluidizing said heating media in said outer section with a first fluidizing gas and causing said heating media to flow through said openings into said inner section, said inner section being formed by said redistributor means and a vertically oriented conduit reactor, said reactor having an inlet, an outlet, and a circular cross-section having a constant diameter over a predetermined distance from said reactor inlet, the plane of said reactor inlet being perpendicular to the axis of said reactor, said reactor having a plurality of secondary inlet slots below the plane of said reactor inlet communicating said inner section with the inside of said reactor;
   c. fluidizing said heating media in said inner section with a second fluidizing gas and causing a first part of said heating media to flow over said reactor inlet and then downwardly in annular column flow along the inside diameter of said reactor, and simultaneously causing a second part of said heating media to flow through said secondary inlet slots into said reactor thereby augmenting the downwardly annular column flow of said first part of said heating media along said reactor inside diameter in such a way that a continuous and substantially circumferentially uniform annular downwardly flowing column of said heating media is formed below said secondary inlet slots;
   d. forming a turbulent stream of particulate coal and a transport gas;
   e. introducing into said reactor said turbulent stream downwardly and along the reactor axis at a point below the plane of said reactor inlet and near the upper part of said substantially circumferentially uniform annular downwardly flowing column of heating media;

f. pyrolyzing said coal in a pyrolysis zone within said reactor and within said predetermined distance from said reactor inlet by transferring heat from said heating media to said coal and producing from said coal a vaporous product and a coal char product; and g. removing a stream comprising said vaporous and char products, said first and second fluidizing gases, and said transport gas from said pyrolysis zone and from said reactor through said reactor outlet.

3. The process of claim 2 wherein said heating media has a temperature between about 800° to about 2000° F., wherein the ratio of said heating media to said coal introduced into said pyrolysis zone is between about 2 to 1 to about 20 to 1, and wherein said coal is heated to a temperature of between about 700° and about 1900° F. in said pyrolysis zone.

4. The process of claim 2 wherein said coal is bituminous coal.

5. The process of claim 4 wherein said bituminous coal is heated to a temperature of between about 1000° and about 1500° F. in said pyrolysis zone.

6. The process of claim 2 or 3 further comprising separating said stream removed through said reactor outlet into a substantially gaseous stream which comprises said fluidizing and transport gases, and a substantially solids stream which comprises said char product and said heating media; heating said separated solids stream by partial combustion with oxygen thereby forming a heated solid stream; and recycling said heated solid stream to said outer section of said fluidization zone as said particulate solid heating media.

7. An apparatus operative for pyrolyzing coals comprising:

a. a conduit reactor having an inlet, an outlet, a circular cross-section of constant inside diameter over a predetermined distance from said inlet, the axis of said reactor being vertically oriented, and the plane of said inlet being perpendicular to said axis;

b. a first feed conduit operative for conveying a mixture comprising a transport gas and particulate coal in turbulent flow, having an inlet and an outlet, having a circular cross-section and an axis which coincides with said reactor axis, the plane of said first feed conduit outlet being perpendicular to said axis and communicating with said reactor inlet in such a way that the plane of said first feed conduit outlet is below the plane of said reactor inlet, said reactor constant inside diameter being at least about three times the largest outside diameter of that part of said first feed conduit which is below the plane of said reactor inlet; and c. a fluidization chamber, operative for fluidizing therein a mixture of particulate solid heating media with a fluidizing gas, said chamber communicating with said reactor inlet, said chamber comprising i. a cylindrical outer shell having an inside diameter which is at least about two times the outside diameter of said reactor, ii. a top cover which is above the plane of said reactor inlet and which is fastened to the upper part of said shell, and said first feed conduit passing through, and being fastened to, said top cover, iii. a bottom cover which is below the plane of said reactor inlet and which is fastened to the lower part of said shell, said reactor passing through, and being fastened to, said bottom cover, iv. a second feed conduit having an outlet, said second feed conduit being operative for introducing a stream of particulate solid heating media into said chamber, said second feed conduit being radially displaced from said reactor, said second feed conduit outlet being below the plane of said reactor inlet, v. an annular redistributor means having an inside and an outside diameter and a large number of openings which extend radially through said redistributor means, said redistributor means being radially outwardly of said reactor outside diameter and radially inwardly of said second feed conduit, said redistributor means extending upwardly to about the plane of said reactor inlet, said redistributor means forming in said chamber an outer fluidization section between said shell and said redistributor means and an inner fluidization section between said reactor outside diameter and said redistributor means, vi. a first fluidization means operative for fluidizing particulate solid heating media in said outer fluidization section of said chamber, vii. a second fluidization means operative for fluidizing particulate solid heating media in said inner fluidization section of said chamber, and viii. a plurality of secondary inlet slots in the upper part of said reactor extending radially through said reactor, said slots having a slot height, a slot width and a downward slope with respect to said reactor axis, said slots being below the plane of said reactor inlet and at about the same height as the plane of said first feed conduit outlet, said slots being operative, when said apparatus is in use, to permit particulate solid heating media to flow from said inner fluidization section through said slots into said reactor.

8. The apparatus of claim 7 wherein said redistributor means inside diameter is at least about 1.25 times said reactor outside diameter, and wherein the upper extremity of said slots is at least about 1 inch below the plane of said reactor inlet, wherein said slot height is at least about ⅛ of an inch, wherein said slot width is at least about 1 inch, and wherein said slots are separated circumferentially by an arc length of at least about 0.5 inch.

9. The apparatus of claim 7 wherein said redistributor means inside diameter is from about 1.25 to about 2 times said reactor outside diameter, and wherein the upper extremity of said slots is about 1 to about 12 inches below the plane of said reactor inlet, wherein said slot height is from about ⅛ to about 1 inch, wherein said slot width is from about 1 to about 6 inches, and wherein said slots are separated circumferentially by an arc length from about 0.5 to about 2 inches.

10. A process for pyrolyzing coal comprising:

a. transporting a turbulent mixture of particulate coal and a transport gas in a first feed conduit having an inlet, an outlet, a circular cross-section, and an axis, the plane of said outlet being perpendicular to said axis;

b. introducing said turbulent mixture of particulate coal and said transport gas downwardly and centrally into a conduit reactor having an inlet, an outlet, a circular cross-section of constant inside diameter over a predetermined distance from said reactor inlet, the axis of said reactor being vertically oriented, the plane of said inlet being perpendicular to said reactor axis, said reactor axis coinciding with said first feed conduit axis, the plane of said first feed conduit outlet being below the plane of said reactor inlet, and the constant inside diameter of said reactor being at least three times the largest outside diameter of that part of said first feed conduit which is below the plane of said reactor inlet;

c. introducing a particulate solid heating media into an outer fluidization section of a fluidization chamber which comprises i. a cylindrical outer shell having an inside diameter which is at least about two times the outside diameter of said reactor, ii. a top cover which is above the plane of said reactor inlet and which is fastened to the upper part of said shell, said first feed conduit passing through, and being fastened to, said top cover, iii. a bottom cover which is below the plane of said reactor inlet and which is fastened to the lower part of said shell, said conduit reactor passing through, and being fastened to, said bottom cover, iv. a first fluidization means spaced above said bottom cover but below the plane of said conduit reactor inlet, v. a second feed conduit having an outlet, said second feed conduit being radially displaced from said reactor, and said second feed conduit outlet being below the plane of said reactor inlet, vi. an annular redistributor means having an inside and an outside diameter and a large number of openings which extend radially through said redistributor means, said redistributor means being radially outwardly of said reactor outside diameter and radially inwardly of said second feed conduit, said redistributor means extending upwardly to about the plane of said reactor inlet, said redistributor means forming in said chamber an outer fluidization section between said shell and said redistributor means and an inner fluidization section between said reactor outside diameter and said redistributor means, vii. a plurality of secondary inlet slots in the upper part of said reactor extending radially through said reactor, said slots having a slot height, a slot width and a downward slope with respect to said reactor axis, said slots being below the plane of said reactor inlet and at about the same height as the plane of said first feed conduit outlet, viii. a first fluidization means positioned in the bottom part of said outer fluidization section of said chamber, and ix. a second fluidization means positioned in the bottom of said inner fluidization section of said chamber at an elevation below that of said secondary inlet slots;

d. fluidizing said heating media in said outer fluidization section with a first fluidizing gas introduced into said first fluidization means and causing said heating media to flow from said outer fluidization section through said openings of said redistributor means into said inner fluidization section;

e. fluidizing said heating media in said inner fluidization section with a second fluidizing gas introduced into said second fluidization means and causing a first part of said heating media to flow over said reactor inlet and then downwardly in an annular downwardly flowing column of heating media along the inside diameter of said reactor and simultaneously causing a second part of said heating media to flow from said inner fluidization section through said slots into said reactor thereby augmenting the annular downwardly flowing column of said first part of said heating media along said reactor inside diameter in such a way that a continuous and substantially circumferentially uniform annular downwardly flowing column of said heating media is formed below said slots;

f. pyrolyzing said coal in a pyrolysis zone within said reactor by the rapid transfer of heat from said heating media to said coal, and producing directly from said coal a vaporous product and a particulate coal char product, and controlling the temperature to which said coal is heated by adjusting the relative amounts of said heating media and said coal introduced into said pyrolysis zone and by adjusting the temperature of said heating media introduced into said outer fluidization section; and g. removing a stream comprising said vaporous and char products, said first and second fluidizing gases, and said transport gas from said pyrolysis zone and from said reactor through said reactor outlet.

11. The process of claim 10 further comprising separating said stream removed from said reactor outlet into a substantially gaseous stream which comprises said first and second fluidizing gases and said transport gas and a substantially solids stream which comprises said char product and said heating media; heating said separated solids stream by partial combustion with oxygen thereby forming a heated solid stream; and recycling said heated solid stream to said fluidization zone as said particulate solid heating media.

12. The process of claim 10 wherein said redistributor means inside diameter is at least about 1.25 times said reactor outside diameter, and wherein the upper extremity of said slots is at least about 1 inch below the plane of said reactor inlet, wherein said slot height is at least about $\frac{1}{8}$ of an inch, wherein said slot width is at least about 1 inch, and wherein said slots are separated circumferentially by an arc length of at least about 0.5 inch.

13. The process of claim 10 wherein said redistributor means inside diameter is from about 1.25 to about 2 times said reactor outside diameter, and wherein the upper extremity of said slots is about 1 to about 12 inches below the plane of said reactor inlet, wherein said slot height is from about $\frac{1}{8}$ to about 1 inch, wherein said slot width is from about 1 to about 6 inches, and wherein said slots are separated circumferentially by an arc length from about 0.5 to about 2 inches.

* * * * *